United States Patent
Weiss, Jr.

[11] 3,715,084
[45] Feb. 6, 1973

[54] QUICK DUMP HOIST
[76] Inventor: Joseph Weiss, Jr., 1010 Larch No. 6, Inglewood, Calif. 90306
[22] Filed: March 5, 1970
[21] Appl. No.: 9,005

Related U.S. Application Data

[63] Continuation-in-part of Ser. No. 745,532, July 17, 1968, abandoned.

[52] U.S. Cl. ............... 242/54 R, 254/150, 254/186, 242/158.2
[51] Int. Cl. .............................................. B65h 75/00
[58] Field of Search ....254/150, 186; 242/84.2 B, 54, 242/158.2

[56] References Cited

UNITED STATES PATENTS

| | | | |
|---|---|---|---|
| 3,425,643 | 2/1969 | Lemon | 242/84.2 B |
| 3,512,757 | 5/1970 | Ostrom | 254/150 R |
| 2,776,515 | 1/1957 | Lynch | 242/84.2 B |
| 2,836,921 | 6/1958 | Lynch | 242/84.2 B |

FOREIGN PATENTS OR APPLICATIONS

211,406    2/1924    Great Britain ...................242/84.2 B

*Primary Examiner*—Harvey C. Hornsby
*Attorney*—Fulwider, Patton, Rieber, Lee and Utecht

[57] ABSTRACT

A quick dump hoist for rapidly lowering a cable from a helicopter and including a main frame secured to the helicopter and a pivotal frame mounted on the main frame and cantileverally carrying a rotatable drum. Means is provided for rotating the pivotal frame to selectively orient the drum in a horizontal, take-up position, wherein the drum may be rotated to wrap cable thereon and a vertical, feed-out position, wherein the cable will fall freely from the end thereof. A track is provided along one side of the drum and supports a threading means which includes an eye for feeding the cable uniformly on the drum as such means is fed along the track in accordance with rotation of the drum during cable take up.

8 Claims, 17 Drawing Figures

PATENTED FEB 6 1973
3,715,084
SHEET 1 OF 3
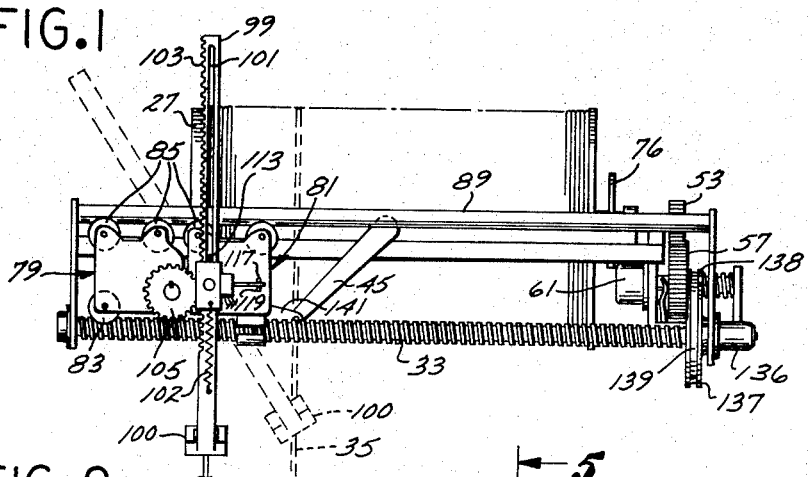
FIG.1
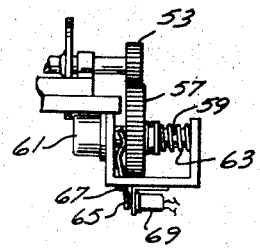
FIG.10
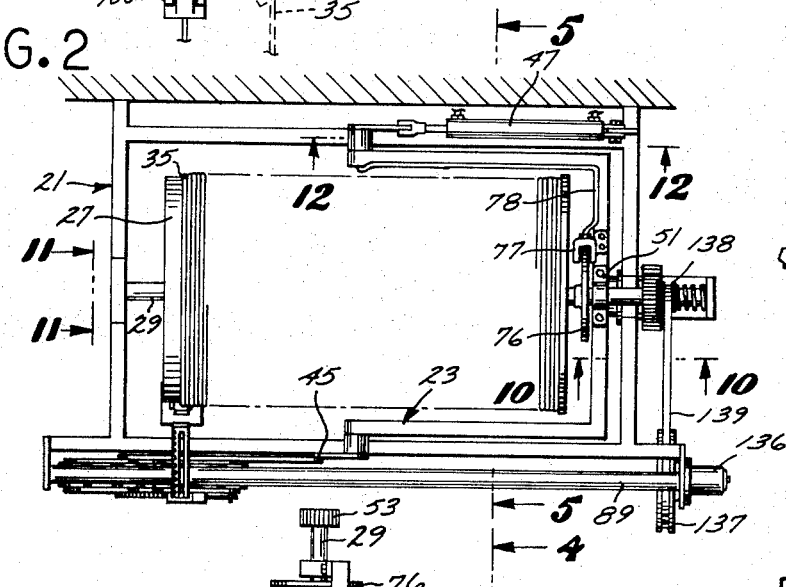
FIG.2
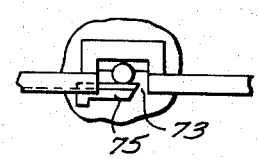
FIG.11
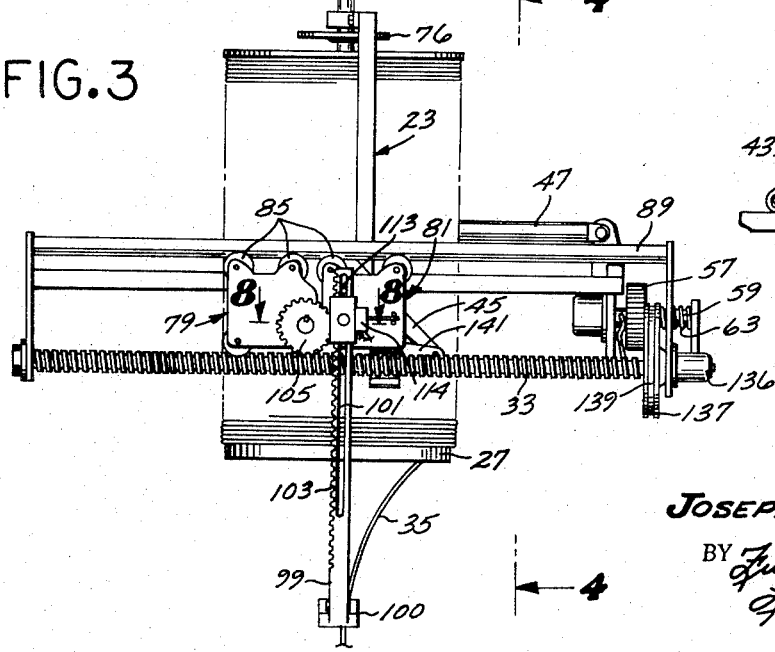
FIG.3
FIG.12
INVENTOR.
JOSEPH WEISS JR.
BY Fulwider, Patton, Rieber,
Lee and Utecht
ATTORNEYS INVENTOR.
JOSEPH WEISS JR.
BY Fulwider, Patton, Rieber Lee and Utecht
ATTORNEYS

PATENTED FEB 6 1973

INVENTOR.
JOSEPH WEISS JR.
BY Fulwider, Patton, Rieber
Lee and Utecht
ATTORNEYS

QUICK DUMP HOIST

CROSS REFERENCE TO RELATED APPLICATIONS

This application is a continuation-in-part of U.S. application Ser. No. 745,532, filed July 17, 1968 and now abandoned.

BACKGROUND OF THE INVENTION

1. Field of the Invention

The present invention relates generally to a hoisting device and more particularly to a hoisting device which may be utilized on a helicopter to provide for rapid feed-out to lower the cable quickly.

2. Description of the Prior Art

Prior art hoisting devices for use with helicopters generally provide for relatively slow pay-out of the cable and are therefore unsatisfactory for rapid deployment of rescue devices to retrieve personnel from a battle area where the personnel to be retrieved are exposed to enemy fire. Many spinning reels have been proposed which incorporate spools pivotable about their longitudinal axis but there are no prior art hoisting devices known to applicant which include a cable wrapping drum which may be rotated to an upright position to dump cable freely off one end thereof.

SUMMARY OF THE INVENTION

The hoisting device of present invention is characterized by a pivotal frame carried on a main frame and cantileverally mounting a rotatable drum whereby the drum may be positioned horizontally to wrap cable thereon or rotated to an upright position to dump cable off the lower end.

The hoisting device may also include a threading means for threading the cable uniformly onto the drum and for enabling free feed-out of the cable as it falls off the end of the upright drum.

The objects and advantages of the present invention will become apparent from the following detailed description when taken in conjunction with the appended drawings.

DESCRIPTION OF THE DRAWINGS

FIG. 1 is an elevational side view of a hoisting device embodying the present invention;

FIG. 2 is a top view of the hoisting device shown in FIG. 1;

FIG. 3 is an elevational view similar to FIG. 1 and showing the hoist in its dumped position;

FIG. 10 is a vertical sectional view taken along the lines 10—10 of FIG. 2;

FIG. 11 is a partial elevational end view, in enlarged scale, taken along the lines 11—11 of FIG. 2;

FIG. 12 is a vertical sectional view taken along the lines 12—12 of FIG. 2;

DESCRIPTION OF THE PREFERRED EMBODIMENT

Figure 4:
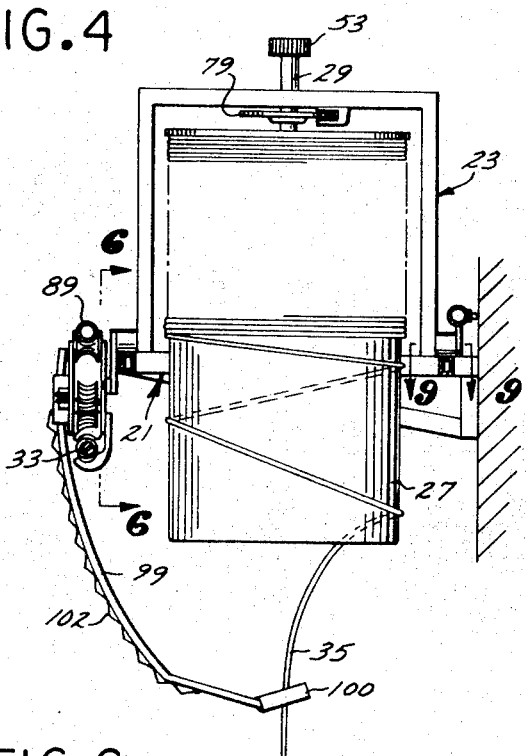
FIG. 4 is a vertical sectional view taken along the lines 4—4 of FIG. 3.

Referring to FIGS. 1 and 3, the hoisting device of present invention comprises, generally, a rectangular-shaped main frame 21 having a U-shaped pivotal frame 23 mounted thereon, such frame 23 cantileverally carrying a shaft 29 which rigidly mounts a cable drum 27. A threading device D is mounted from a horizontal rail 33 extending longitudinally of the drum 27 and guides the cable 35 to wrap it uniformly on the drum 27. Thus, the pivotal frame 23 may be pivoted to stand the drum 27 on end, as shown in FIGS. 3 and 4, to cause the cable 35 to unspiral and fall from the lower end thereof to thereby drop its free end from the helicopter to personnel on the ground or to lower personnel to the ground.

The drum 27 is formed on it top end, as viewed in FIG. 3, with a cable-retaining flange and its bottom extremity is in the form of a flangless smooth barrel for free release of the cable 35 when such drum is in its upright position.

Figure 9:
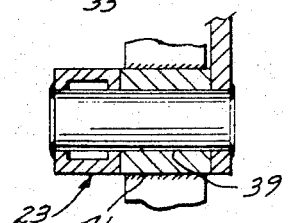
FIG. 9 is a horizontal sectional view, in enlarged scale, taken along the lines 9—9 of FIG. 4.

Referring to FIGS. 4 and 9, the pivotal frame 23 includes a pair of aligned pivot pins 39 projecting outwardly from its opposite ends, such pins being journaled through bushings 41 in the midsection of the main frame 21. Referring to FIG. 2, lever arms 43 and 45 are welded to the outer ends of the pivot pins 39, the lever arm 43 being connected to the rod of a dump piston 47 which has its other end secured to the main frame 21, and the lever arm 45 having its projecting end connected to the threading device D to pull it along the track 33 as the drum 27 is up-ended.

Still referring to FIG. 2, a pillow block 51 is mounted on the closed end of the pivotal frame 23 and the drum shaft 29 is journaled therethrough, the shaft 29 projecting beyond such block and mounting a driven pinion 53. The pinion 53 is driven by a drive pinion 57 carried on the drive shaft 59 of a hydraulic motor 61. Referring to FIG. 10, the drive pinion 57 is slidable axially on the shaft 59 and is biased into engaging alignment with the driven pinion 53 by a coil spring 63 coiled about the shaft 59. A lever 65 is pivotally mounted from the frame 21 by a pivot pin 67 and is rotated on such pivot pin by means of a clutch solenoid 69 which projects its plunger to rotate the lever 65 and drive the pinion 57 to the right out of engagement with the driven pinion 53.

When the drum 27 is in its horizontal position, the free end of the shaft 29 is received in an open bottom notch 73 (FIG. 11) formed in the left hand end of the rectangular frame 21 and a slider 75 slides thereunder to support such shaft.

Referring to FIG. 2, a dish brake 76 is rigidly secured to the shaft 29 at the right hand end of the drum 27 and a clevis shaped fitting 77 spans the peripheral edge thereof. The fitting 77 includes a hydraulic actuated plunger connected with the hydraulic source by a hydraulic line 78 whereby such plunger may be hydraulicly extended to brake the disc 76.

The threading device D includes a master trolley 79 and a slave trolley 81, such trolleys including wheels 83 which ride on the screw track 33 and wheels 85 which engage a tubular guide rail 89 to hold such trolleys captive between the track 33 and such rail.

Figure 8:
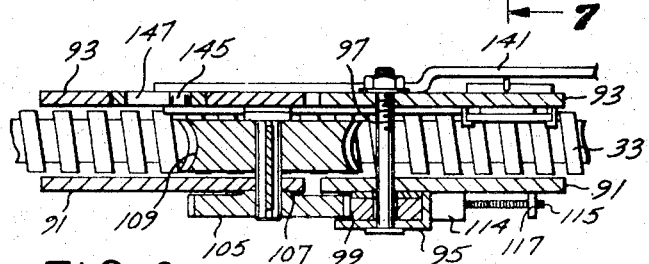
FIG. 8 is a horizontal sectional view, in enlarged scale, taken along the lines 8—8 of FIG. 3.
Figure 7:
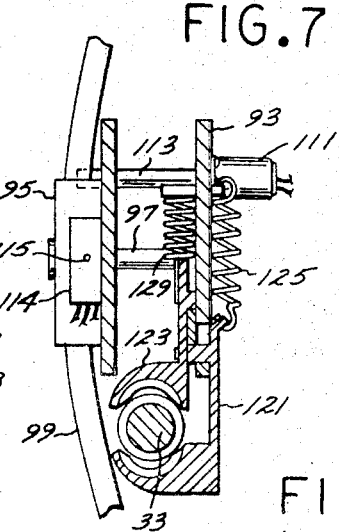
FIG. 7 is a vertical sectional view taken along the lines 7—7 of FIG. 6.

Referring to FIGS. 7 and 8, the slave trolley 81 includes a pair of upstanding plates 91 and 93 disposed on opposite sides of the wheels 83 and 85. A C-channel 95 is supported from the slave trolley 81 by means of a pivot pin 97 and a vertical rack 99 is received slidably therein. The cable 35 is fed through an eye 100 on the lower end of the rack 99 and such rack is arcuately shaped whereby when it is lowered to the position shown in FIG. 4, such eye will be disposed centrally beneath the drum 27. The rack 99 is biased to its upper position by a tension spring 102 connected between the channel 95 and such rack. The rack 99 includes a longitudinal slot 101 for receiving the pivot pin 97 and has geared teeth 103 formed along one side thereof for meshing with a pinion 105 mounted on a common shaft 107 with a pinion 109 carried intermediate the walls 91 and 93 for meshing with the threads on the track 33. Still referring to FIG. 7, a solenoid 111 is mounted on the back side of the upstanding wall 93 and has its plunger 113 projecting therethrough and through the wall 91 to engage the longitudinal slot 101 in the rack 99 to prevent rotation thereof on the pivot pin 97. Referring to FIGS. 1 and 8, a double acting microswitch 114, the purpose of which is set forth below, is mounted on the channel 95 and includes a projecting actuating arm 115 which has its free end held captive between a pair of pins 117 and 119.

Figure 6:
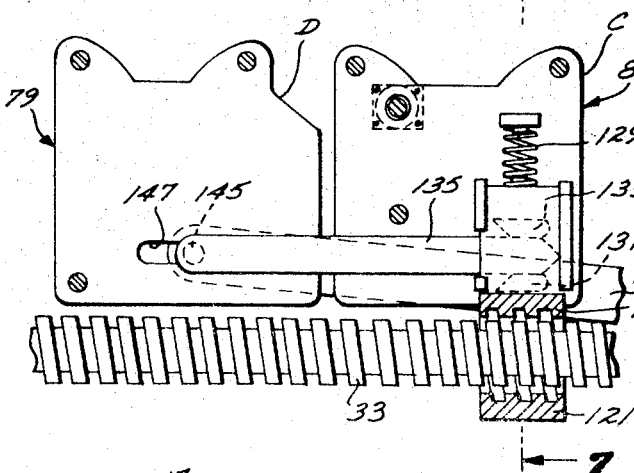
FIG. 6 is a vertical sectional view, in enlarged scale, taken along the lines 6—6 of FIG. 4.

Referring to FIGS. 6 and 7, the slave trolley 81 is indexed with the screw slide 33 by means of a half nut assembly including a lower nut fitting 121 and an upper nut fitting 123. The lower nut fitting 121 is biased upwardly into engagement with the screw track 33 by a tension spring 125 and the upper nut portion 123 is biased downwardly by a compression spring 129. Referring to FIG. 6, the upper and lower nut portions 123 and 121 are formed with projecting lugs 131 and 133, respectively, which are tapered on one end for engagement by a pointed end of a slider 135 which is selectively forced therebetween to spread the nut portions to disengage them from the screw track 33. Referring to FIG. 2, the track screw 33 is driven by a reversible electric motor 136 and mounts a drive pulley 138 on the drum shaft 29 by an endless belt 139.

Referring to FIGS. 1, 3 and 6, the trolleys 79 and 81 are positioned by means of a connecting link 141 which connects to the free end of the lever arm 45, the opposite end of such connecting link 141 being connected with the slider 135 by means of a connecting pin 145 which projects through a slot 147 in the body of the master trolley 79.

Figure 5:
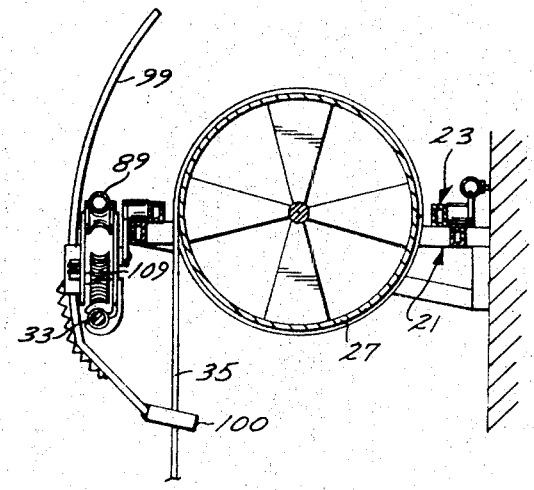
FIG. 5 is a vertical sectional view taken along the lines 5—5 of FIG. 2.

In operation the dump hoist of present invention may be controlled by a control apparatus including a joy stick for accomplishing all the functions about to be described. When the cable 35 is to be deployed, the joy stick would be moved to the deployment position thereby causing the slider 75 (FIG. 11) to retract and extending the dump cylinder 47 to rotate the drum 27 to its upright position shown in FIG. 4. Referring to FIGS. 1 and 3, such dumping of the drum 27 rotates the lever 45 through 90° to the position shown in FIG. 3 thereby pulling the master trolley 79 to the right and interjecting the slider 135 (FIG. 6) between the lugs 131 and 133 to spread the half nuts 121 and 123 (FIG. 7) thereby disengaging the slave trolley 81 from the slide screw 33. This is accomplished in the first portion of rotation of the lever arm 45 and during the remainder of the rotation, the master trolley 79 abuts against the slave trolley 81 meshing the pinion 105 with the teeth 103 on the rack 99 and pulling such rack downwardly against the bias of the spring 102. Movement of the threading device D from the position shown in FIG. 1 to the position shown in FIG. 3 drives the rack 99 downwardly from the position shown in FIG. 5 to the position shown in FIG. 4 thereby aligning the eye 100 centrally under the drum 27 for convenient deployment of the cable 35. A relatively heavy item, such as a weighted hook, will be carried on the end of the cable 35 thereby causing the cable to be pulled rapidly from the lower end of the drum 27 and to drop at essentially the speed dictated by gravity.

When sufficient cable has been deployed, the aforementioned control lever (not shown) will be positioned to retract the control piston 47 and return the drum 27 to its horizontal position shown in FIGS. 1 and 2. Such horizontal positioning of the drum will cause the arm 45 to push the master trolley to the left thereby disengaging the slider 135 from the lugs 131 and 133 to enable the nut fittings 121 and 123 to lamp against the track screw 33. At this time the solenoid 111 (FIG. 7) is energized to retract its plunger 113 to enable the rack 99 to pivot freely on its pivot pin 97 to align the eye 100 directly below the last wrap of cable 35 as shown in broken lines in FIG. 1. The clutch solenoid 61 is also actuated to slide the drive pinion 57 out of engagement with the driven pinion 53 to disengage the track screw 33 from the drum 27 whereby such screw may be rotated by its motor 136 without rotation of the drum. Pivoting of the rack 99 to the inclined position shown in broken lines in FIG. 1 closes the associated contacts in the switch 114 to rotate the track motor 136 to pull the slave trolley 81 to the right thereby aligning itself with the last wrap of cable and enabling the rack 99 to again assume its vertical orientation. When such vertical orientation is assumed the switch 114 will open the circuit to the motor 136 and the solenoid 111 will be de-energized to project the plunger 113 into the rack slot 101 to maintain the rack 99 vertical. The clutch solenoid 59 is then de-energized to permit the coil spring 63 to push the drive pinion 57 into driving engagement with the driven pinion 53 whereby upon rotation of the track screw 33 the drum will be driven by the belt 139 to wrap the cable thereon and the slave trolley 81 is fed leftward along the track screw 33 to thread the cable 35 uniformly on the drum 27.

When the hoist of present invention is utilized to deploy personnel from a helicopter, the drum 27 may be left in its horizontal position and the solenoid 61 actuated to disengage the pinions 53 and 57 to enable each drum to free-wheel and rapidly pay out the cable while being monitored by the brake.

Figure 13:
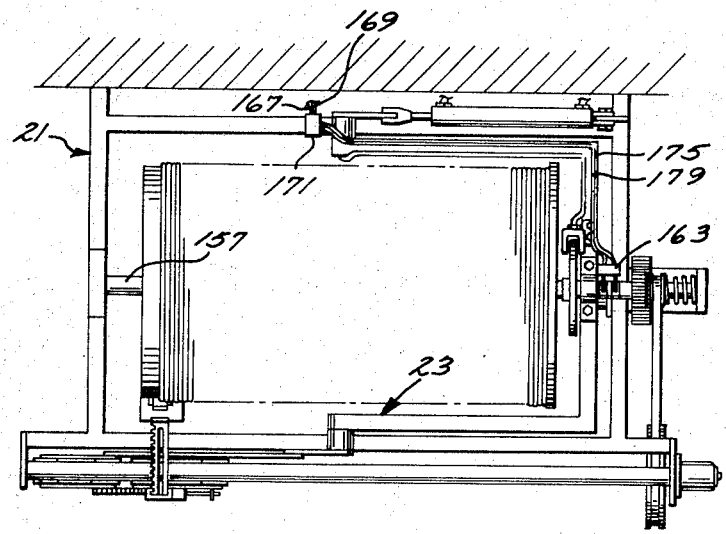
FIG. 13 is a top plan view of a second embodiment of the hoisting device of present invention.

The hoisting device shown in FIG. 13 is similar to that shown in FIG. 1 except that wound around the inside of the drum 153 is an electromagnetic coil, generally designated 151, that attracts the cable 35 to restrict feeding thereof off the lower end of such drum. A mounting shaft 157 extends through the drum 153 and mounts a pair of electrically conductive rings 159 and 161 thereon. Mounted adjacent the rings 159 and 161 is a brush housing 163 which includes a pair of brush elements that engage the respective rings 159 and 161.

A pair of electrical leads 167 and 169 lead from the helicopter electrical system to a switch 171 mounted on the frame 21. The switch 171 is responsive to the rotary position of the pivotable frame 23 and is closed when such frame is pivoted to the position shown in FIG. 14. A pair of electrical leads 175 and 179 lead from the switch 171 to the brush housing 163.

Figure 14:
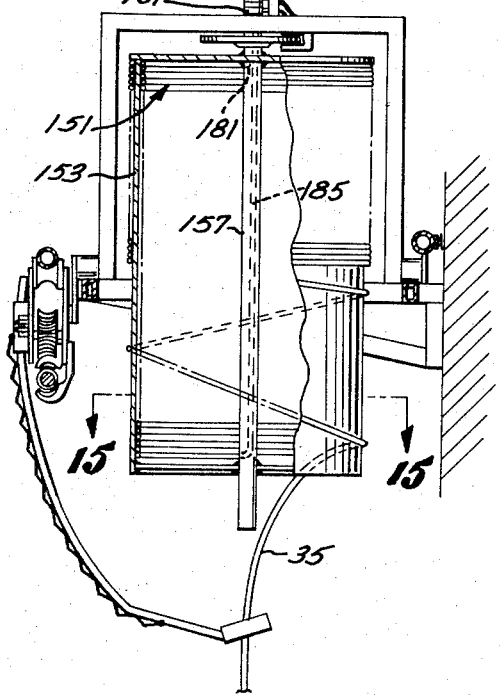
FIG. 14 is an end view of the hoisting device shown in FIG. 1 with the spool dumped on end.
Figure 15:
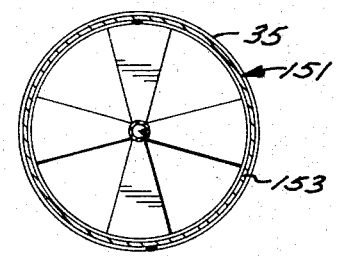
FIG. 15 is a horizontal sectional view taken along the line 15—15 of FIG. 14.
Figure 16:
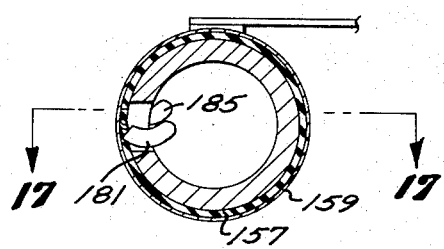
FIG. 16 is a horizontal sectional view, in enlarged scale, taken along the line 16—16 of FIG. 14.
Figure 17:
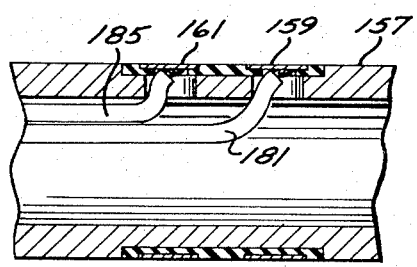
FIG. 17 is a vertical sectional view taken along the line 17—17 of FIG. 16.

Referring to FIG. 14, an electrical lead 181 leads from the brush 159 and down the hollow shaft 157 and extends through the wall of the shaft 157 and connects the top end of the electromagnetic coil 151 which lines the inner wall of the drum 153. The opposite end of the coil 151 is connected with the second ring 161 by means of an electrical lead 185.

Thus, when the drum 153 is pivoted to its upright dumping position shown in FIG. 14, the switch 171 will be closed to initiate electrical current in the electromagnetic coil 151 and magnetize the drum thereby attracting the electromagnetic cable 35 to the drum and causing such cable to feed off the lower end of such drum one coil at a time in an orderly fashion.

From the foregoing it will be apparent that the quick dump hoist of present invention provides a convenient and rapid means for deploying cable and a positive recovery means whereby items being lowered or raised from the helicopter need spend only short periods of time in suspension.

Various modifications and changes may be made with regard to the foregoing without departing from the spirit of the invention.

I claim:

1. A quick dump hoist for hoisting from a predetermined direction and comprising:
   a main frame;
   a pivotal frame;
   mounting means pivotally mounting said pivotal frame from said main frame for pivoting thereof between a take-up position and a feed position;
   a drum carried on said pivotal frame for being rotated between a winding position with its axis extending transverse to said predetermined direction and a dump position with its axis projecting in said predetermined direction as said pivotal frame is pivoted between said take-up and feed position;
   trip means engaging said pivotal frame to retain said pivotal frame from rotation between said pivotal frame for rotation between said take-up and feed positions;
   threading means including track means extending axially of said drum, a carriage movable along said track means, holding means carried by said carriage for receipt of said cable to guide said cable onto said drum, and control means connected between said drum and said carriage for drawing said carriage along said track means at a rate corresponding to the speed at which said drum is rotated;
   release means for automatically releasing said holding means to free said cable when said drum is pivoted to said dump position; and
   drive means for rotating said drum whereby said drive means may be actuated with said drum in its winding position to take up said cable and said trip means and release means may then be actuated to pivot said drum to its dump position and concurrently release said holding means to free said cable for feeding freely from the end of said drum.

2. A quick dump hoist as set forth in claim 1 wherein:
   said holding means includes an eye forming a closed loop;
   said release means includes a rack means carrying said eyes and coupled with said track means and operative in response to rotation of said drum from said winding position to said dump position to move said eye to a position at the end of said drum for free feeding of said cable therethrough.

3. A quick dump hoist as set forth in claim 1 wherein said holding means includes an eye and said threading means includes a rack supporting said eye on its lower end and carried on said carriage, said rack being movable on said carriage between a feedout position with said eye disposed centrally under the bottom end of the dumped drum and a threading position with said eye disposed at one side of said drum.

4. A quick dump hoist as set forth in claim 1 that includes:
   means for disengaging said carriage from said track means to enable the weight of the cable suspended from said drum to, when said drum is in its winding position, pull said eye into alignment with the last wrap of cable on said drum.

5. A quick dump hoist as set forth in claim 3 that includes:
   a lever arm on said pivotal frame and connected with said carriage to pull said carriage along said track to said feed-out position when said hoist is dumped.

6. A quick dump hoist as set forth in claim 3 wherein said rack includes gear teeth, said threading means includes a lever arm connecting said pivotal frame with said carriage to pull said carriage along said track when said drum is rotated to its dump position, a gear carried on said carriage and driven by said track as said carriage moves relative thereto, said gear meshing with said track to feed said rack downwardly as said hoist is dumped to dispose said eye in its feed-out position.

7. A quick dump hoist as set forth in claim 3 wherein said rack is supported pivotally from said carriage, and is formed with a longitudinal guideway, said threading means includes a guide pin normally projecting into said guideway and means for selectively retracting said guide pin to free said rack to pivot, register means responsive to the amount of pivoting of said rack for moving said carriage along said track to align said guideway with said pin whereby when said drum is rotated from its dump position to its winding position and said pin retracted from said guideway said rack will be rotated by the weight of the suspended cable to align said eye with the last wrap of cable on said drum to actuate said register means and move said carriage along said track into alignment with said eye, said pin extended and said drive means actuated to rotate said drum and drive said threading means.

8. A quick dump hoist as set forth in claim 1 wherein: said drum includes attraction means for attracting said cable thereto to restrict said cable from uncontrolled dumping off said one end when said drum is rotated to said dump position.

* * * * *